(No Model.)

J. A. HOWELL & H. A. POOLER.
CENTRIFUGAL CREAMER.

No. 366,483. Patented July 12, 1887.

Witnesses
Wm M. Rheem.
David H. Mead.

Inventor
Jas. A. Howell
Hiram A. Pooler
By their Attorney
W. R. McIntire

United States Patent Office.

JAMES A. HOWELL AND HIRAM A. POOLER, OF GOSHEN, NEW YORK, ASSIGNORS OF ONE-HALF TO CHARLES A. COOPER, OF OIL CITY, PENNSYLVANIA, AND EDWARD W. MARTIN, OF NEW YORK, N. Y.

CENTRIFUGAL CREAMER.

SPECIFICATION forming part of Letters Patent No. 366,483, dated July 12, 1887.

Application filed October 16, 1885. Renewed December 10, 1886. Serial No. 221,183. (No model.)

*To all whom it may concern:*

Be it known that we, JAMES A. HOWELL and HIRAM A. POOLER, citizens of the United States, residing at Goshen, New York, have invented new and useful Improvements in Centrifugal Creamers, of which the following is a specification.

This invention relates to means for purifying milk by means of centrifugal force.

The object of the invention is to produce a separator in which the foreign substances and impurities contained in the milk will be retained and the pure and light milk will be carried upward and discharged.

The invention consists, substantially, in the vessel as constructed, and to be more particularly described hereinafter, and pointed out in the claim.

In order that those skilled in the art to which our invention appertains may know how to make and use the same, we will now proceed to describe it in connection with the accompanying drawings, in which—

Figure 1:
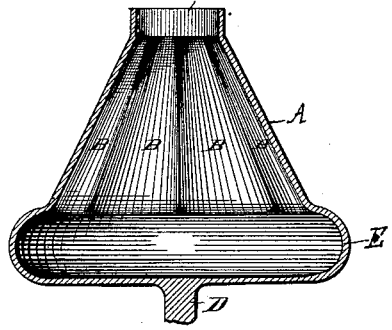
Figure 2:
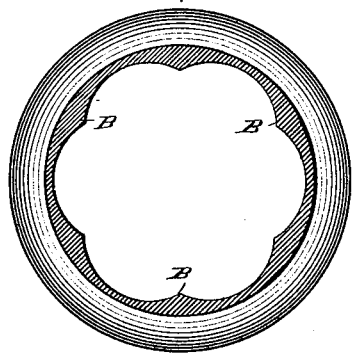

Figure 1 is a central vertical section, and Fig. 2 is a horizontal section.

In the drawings, A represents the main portion of the separator, which is preferably made of metal, and is of conical form, as shown. It is provided with an opening, C, in the top, through which the milk to be purified is introduced.

B B represent a series of projecting ribs, which extend inward from the vessel, the function of which is to hold the milk and insure its revolving as fast as the vessel, in order that the greatest possible amount of centrifugal force may be exerted upon the milk. These ribs are formed with the main portion of the separator, and extend down to the point at which the annular chamber begins.

E represents an annular indentation, extending around the lower part of the vessel, into which the heavier substances, which are of greater specific gravity than the milk, and consequently fall to the bottom thereof, are thrown by centrifugal force and retained. The sides or walls forming the annular indentation do not intersect with the sides of the separator proper in the direct line, but are made to extend outwardly beyond the same, thus forming approximately a separate chamber, whereby the sediment is more apt to be retained in the bottom by reason of the centrifugal force tending to carry it farther outward than would be the case if the said chamber were not so extended.

D represents a spindle, which is formed with or attached to the vessel, and through which rotary motion is imparted to the said vessel.

In the operation of the device the vessel is revolved at the rate of from five hundred to ten thousand revolutions per minute, and while so revolving the milk is introduced through the center of the opening in the top of the vessel. The milk falls to the bottom and is carried to the inner face of the vessel, and the heavier portions, being carried farthest outward and nearer the bottom of the vessel, are consequently confined in the annular enlargement near the bottom. The lighter substance is carried up along the inner face of the vessel, and is discharged through the opening in the top at the edges thereof, from which it may be conveyed to any desired point.

We are aware that in the present class of inventions it is not new, broadly, to form the vessel or creamer proper in the shape of a hollow shell having a contracted open neck; and, also, that it is usual to provide centrifugal creamers with internal wings; but we are not aware that a centrifugal creamer has ever been heretofore devised involving the particular construction herein claimed.

Having thus described our invention, what we claim as new, and desire to secure by Letters Patent, is—

The herein described centrifugal creamer, consisting of the hollow conical vessel A, open at the top, provided with inclined corrugated sides and at its base with an annular enlarged portion or swell projecting beyond the plane of the sides, and forming a chamber, E, in which the sediment is retained.

In testimony whereof we have hereunto set our hands and seals in the presence of two subscribing witnesses.

JAMES A. HOWELL. [L. S.]
   HIRAM A. POOLER. [L. S.]

Witnesses:
 O. HOWELL,
 SENECA JESSUP.